UNITED STATES PATENT OFFICE.

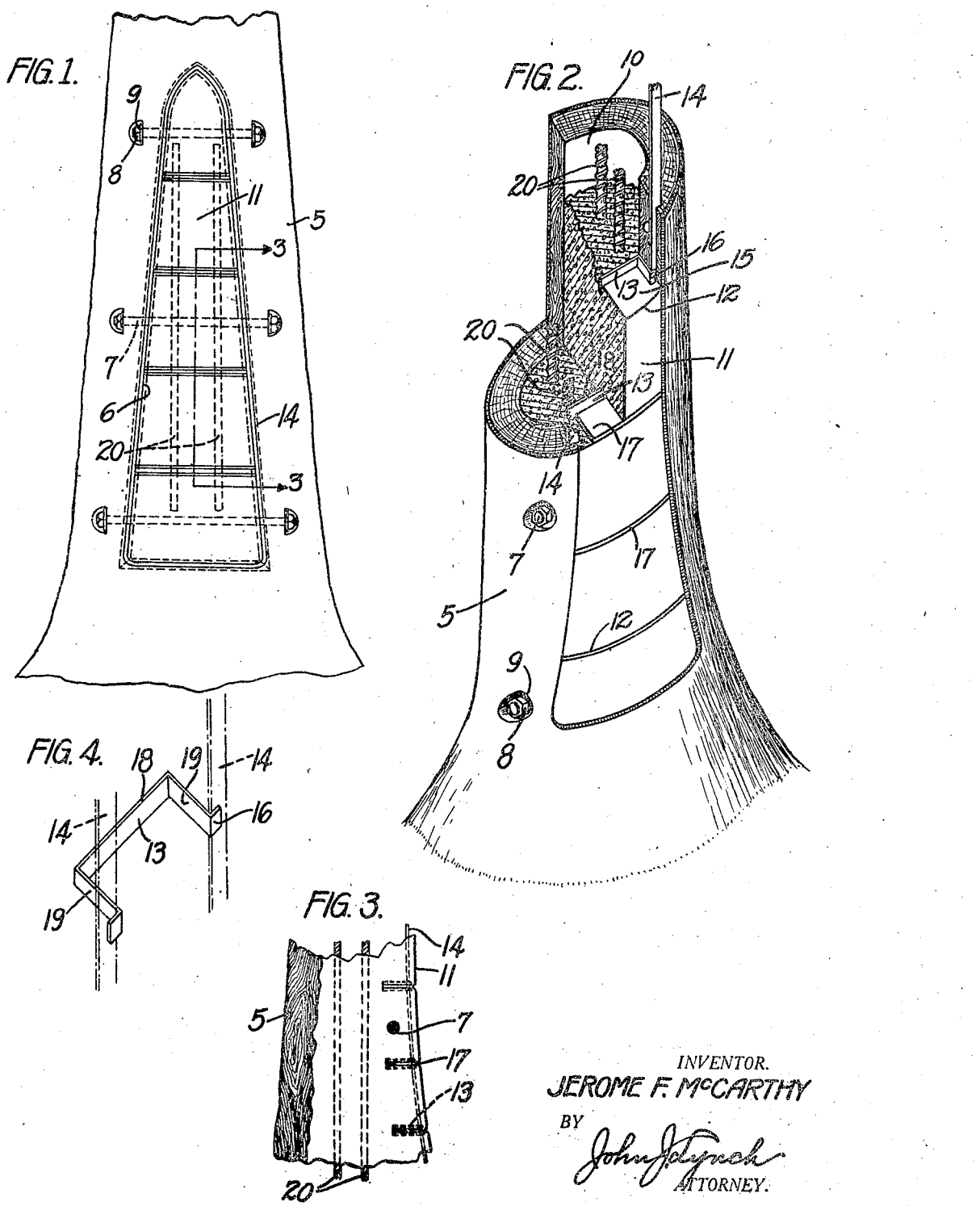

JEROME F. McCARTHY, OF BROOKLYN, NEW YORK.

PROCESS OF PROVIDING TREE CAVITIES WITH MONOLITHIC FILLINGS.

1,414,195. Specification of Letters Patent. Patented Apr. 25, 1922.

Continuation of application Serial No. 368,177, filed March 23, 1920. This application filed October 27, 1920. Serial No. 419,818.

*To all whom it may concern:*

Be it known that I, JEROME F. MCCARTHY, a citizen of the United States, residing at 415 Forty-ninth Street, city of Brooklyn, county of Kings, State of New York, have invented Processes of Providing Tree Cavities with Monolithic Fillings, of which the following is a specification.

This application is a continuation of application, Serial Number 368,177, filed March 23, 1920, and has added thereto only several additional features not shown in said application.

This invention relates to improvements in the treatment of trees which have been weakened by decay so that cavities are formed therein. If neglected, the decay will continue throughout the tree and, aided by fungus and insects, will eventually destroy said tree.

Important objects are to provide an improved solid filling, to prevent the side walls of the cavity from spreading apart, to provide a means of keeping the opposite walls of the cavity against the filling at all times, to avoid surface cracking, and to give the filling a slight elasticity.

Another object is to fill the cavity in such a manner that when the tree moves under wind pressure the filling will not crack and drop out but will give slightly.

Another important object is to have a solid column of filling which not only will act as a reinforcement in the center of the tree but will seal the rear walls of the cavity at all points, thus making it impossible for any foreign matter, insects or moisture, to reach said walls. This solid column of filling also confines or prevents the spreading of a disease of the tree known as "slime flux" which is found in the heart of the tree, due to an injury to the heartwood and which causes the emission of an ugly looking liquid, which finds its way to the outside of a sectional filling and not only spoils the appearance of the filling work but kills the bark wherever it touches it. It is known, however, that it kills the cambium layer and eventually the tree. This solid portion, in conjunction with other features of construction, absolutely prevents this deadly disease from reaching the most tender part of the tree, namely the cambium layer.

Another important object is to insert in the entrance walls of the cavity a piece of metal which will form a watershed, and which will not cause any injury to the tree. The old practice was to cut away or recess the wood near the entrance of the cavity to form a watershed, but this method caused injury to the tender cambium layer, due to constant hammering necessary in the recessing operation.

Referring to the accompanying drawings in which my improved process of filling a tree over the old solid filling is illustrated:—

Fig. 1 is a front view of a tree having an unsound portion or cavity, treated in accordance with my improvements.

Fig. 2 is perspective view of different portions of a tree showing the cavity therein, the tree being cut half way through on one elevation at a crevice to disclose the relative positions of the filling, reinforcing rods and compressible material and being cut the rest of the way through at a higher elevation to show the upper surface of the filling ready to receive the compressible material and thereby form, when the filling-in is continued, another crevice; the inner part of the cavity being shown larger than the outer. This serves to prevent the filling from falling out.

Fig. 3 is a reduced representation of a portion of the vertical section taken on lines 3—3 of Fig. 1 through the cavernous portion of the tree showing the filling and crevices therein, the latter of which contain the compressible material.

Fig. 4 is a perspective detailed view of one of the auxiliary watersheds showing its relative position to the main watersheds, which are represented in outline.

In the said drawings 5 indicates an interiorly hollow portion of the trunk of a tree having its internal cavity 10 extending to the interior and up and down or longitudinally of the trunk.

In carrying out my improved process, all decayed or unsound wood is removed from the walls of the cavity 10, then the said walls are disinfected and waterproofed. The walls are then mechanically locked together at vertically spaced points by bolts which are suitably threaded, so that two nuts and two washers may be screwed thereon. In Fig. 1, 7 represents a threaded bolt which extends through two bolt holes which are drilled in opposite side walls, a short distance from the exterior edge 6 of said side walls.

Each bolt 7 which extends through these bolt holes has, at its extremities, nuts 8 and washers 9, which when "screwed on" the rod, press against the exterior walls. When the tree moves under wind pressure, the interior walls of the tree, if not rigidly connected, will move up and down in relation to each other. These walls will also have a tendency to come together. The method hereinafter explained prevents this action of the walls from cracking the cementitious filling, after said filling has "set."

The bolts 7 are inserted in the tree at intervals, the intervals depending upon the size of the cavity 10 and the weakness of the tree. The nuts 8 on both ends of said bolts are then screwed on just far enough so that they engage the exterior walls of the cavity with a slight pressure.

The main watershed 14 is then partly embedded in the entrance walls of the cavity 10 about an inch in from the exterior edges 6 of said cavity. This watershed 14 extends all the way around the entrance to the cavity. This inserted main watershed 14 prevents any water, insects or foreign matter from getting in behind the filling. It is composed of a thin piece of non-corrodible metal, such as zinc, about half an inch wide. It is inserted into the wall about half its width. The other half which projects, being embedded in the filling 11 when the cavity is filled and thus acting as a reinforcement of the outer portion of the filling. This method is quick and inexpensive and the watershed will not crack the cementitious filling.

The cavity 10 is then ready for filling, this being done with a cementitious material 11, which is built up a short distance or to where a crevice or opening 12 is to be left in said filling. Reinforcing rods 20 are then sunk into the filling 11 in suitable arrangement, preferably near the center of the cavity and in such position as to absolutely prevent any cracking of the solid portion of the filling and to strengthen the center of the filled tree.

The upper surface 15 of the filling 11 is then slicked off horizontally for about one quarter to one third the distance back from the outer surface of said filling and an auxiliary watershed 13 is then partly embedded in the upper surface of the filling, this watershed also extending from one quarter to one third the distance back and forming, as it were, the rear wall of the crevice to be subsequently made.

The auxiliary watersheds 13 that are thus inserted in the crevices 12 are substantially U shaped and are so bent that the side portions 19 thereof will have to be slightly compressed to fit between the inwardly projecting edges of the main watershed 14. Thus the outer ends of these portions 19 will have a tendency to press against said edges of the watersheds 14 and thereby insure a perfect fitting joint. The extreme ends 16 of the portions 19 are bent at right angles to said portions and contact with the outer sides of the main watersheds 14.

This prevents any insects or foreign matter reaching the walls of the cavity 10 after the compressible material has partly worn away. It also acts as a further safeguard against moisture possibly getting behind the main watershed 14 and is a positive preventative against the slime flux exuding from the filling.

One or more layers of compressible material 17, such as tar paper, is now laid on the surface 15 of the filling 11. It is so cut that it extends from the outer face of the filling 11 inwardly to the auxiliary watershed 13 and from side wall to side wall of said cavity. The side portions 19 of the auxiliary watershed 13 project through suitable slits in the compressible material 17 and the rear portion of the watershed projects above the compressible material.

The filling-in of the cementitious material 11 is then continued behind and over the auxiliary watershed and over the compressible material. In this way the tree is completely filled and the main and auxiliary watersheds being made of metal, which is in itself somewhat elastic, unite the filling at the crevices and give the entire filling a slight elasticity so that there is no possibility of the solid portion of the tree cracking at the crevices, nor is there any tendency for the surface of the filling at the periphery to crack.

A coat of waterproofing is then applied at the outer edge of the crevices and compressible material. This serves to keep moisture out of the crevices.

When the bolts 7 have been embedded in the cementitious filling 11, and the nuts 8 and washers 9 are engaging the exterior walls of the tree, the tree and filling 11 will have a fixed relation.

While the cementitious filling 11 is hardening it contracts to a slight degree. This must be guarded against near the outer edges of the cavity, forward of the main watershed, to prevent the admission of insects and moisture and also to prevent the side walls of the cavity 10 from moving through the space left by the "setting" of the filling 11 when the tree is moving under wind pressure, this movement of the walls when striking against the filling 11 having a tendency to crack said filling and cause pieces of it to fall out.

After putting the bolts 7 in their place as before stated, the nuts 8 were screwed thereon, so as to press slightly against the exterior walls of the tree. When the filling 11 has partly hardened or "set", the nuts 8 are screwed against the exterior walls of the tree so as to close up the space left between the walls of the cavity and the filling 11 by the setting of the latter, and in addition enough to compress the wood of the tree so that, when said filling has taken its permanent "set," the wood will have expanded sufficiently to close up any additional space occasioned by said "setting."

The side walls of the cavity are thus locked to the filling and there will be no relative movement between them, either up or down or sidewise. When the tree is bending under wind pressure, the walls of the cavity near the entrance of said cavity will move up or down, depending upon which way the tree is bending. These walls being locked to the filling 11 will carry said filling with them, and the filling, having a certain amount of elasticity due to the compressible material and watersheds embedded therein, will yield with the walls where the movement of said walls is greatest; viz., near and at the entrance of the cavity.

Having described my invention, what I claim is:—

1. An improved process of treating a tree having an interior cavity which is formed in the trunk of the tree and extends to the exterior and longitudinally of said tree, which comprises; embedding a watershed in the walls of the entrance of said cavity and closing the cavity with a reinforced slotted filling.

2. An improved process of treating a tree having a cavity which is formed in the trunk of the tree and extends to the exterior and longitudinally of said trunk, comprising; mechanically tying together opposite side walls of the cavity at points spaced longitudinally of the trunk; partly embedding a watershed in the walls of the entrance of the cavity, placing vertical reinforcing rods in the cavity, building up within said cavity a cementitious filling, embedding impervious material and rearwardly extending, substantially vertical U-shaped, watersheds in said filling at points spaced longitudinally of the filling, and compressing opposite side walls of the cavity against the filling after said filling has hardened.

3. An improved process of treating a tree having a cavity which is formed in the trunk of the tree and extends to the exterior and longitudinally of said tree; said process consisting of mechanically tying the opposite side walls of the cavity together at longitudinally spaced points; placing vertical reinforcing rods in the rear of the cavity, embedding a main watershed in the walls of the entrance of said cavity, filling said cavity with a cementitious material, and at intervals during said filling horizontally finishing off a portion of the surface of the filling from one quarter to one third the distance inwardly from the exterior edge of said filling; partly embedding an auxiliary watershed in the upper surface of the filling so that said watershed extends from the main watershed rearwardly to the end of the horizontally finished off portion of the surface of the filling; laying upon said portion of the surface of the filling a compressible material, so cut as to allow the sides of the auxiliary watershed to project therethrough.

4. An improved process of treating a tree having a cavity which is formed in the trunk of the tree and extends to the exterior and longitudinally of said tree, said process consisting of mechanically tying the opposite side walls of the cavity together at longitudinally spaced points; embedding a main watershed in the walls of the entrance of said cavity, filling said cavity with a cementitious material, and at intervals during said filling horizontally finishing off a portion of the surface of the filling inwardly from the exterior edge of said filling; partly embedding an auxiliary watershed in the upper surface of the filling so that said watershed partly surrounds and extends from the main watershed rearwardly to the end of the flat portion of the surface of the filling; laying upon said flat portion of the surface of the filling a compressible material so cut as to allow the sides of the auxiliary watershed to project therethrough.

5. An improved process of treating a tree having an interior cavity which is formed in the trunk of the tree and extends to the exterior and longitudinally of said trunk which comprises, partly embedding a watershed in the entrance walls of the cavity longitudinally of the trunk and filling the cavity and enclosing the protruding portion of the watershed.

6. An improved process of treating a tree having an interior cavity which extends to the exterior of said tree, which comprises; embedding a watershed in the walls of the entrance of said cavity and closing the cavity with a filling.

In testimony whereof, I have signed my name to this specification this 12th day of October, 1920.

JEROME F. McCARTHY.